Dec. 1, 1942.      F. W. MEREDITH      2,303,752
SERVO-CONTROL APPARATUS
Filed July 9, 1940      3 Sheets-Sheet 1

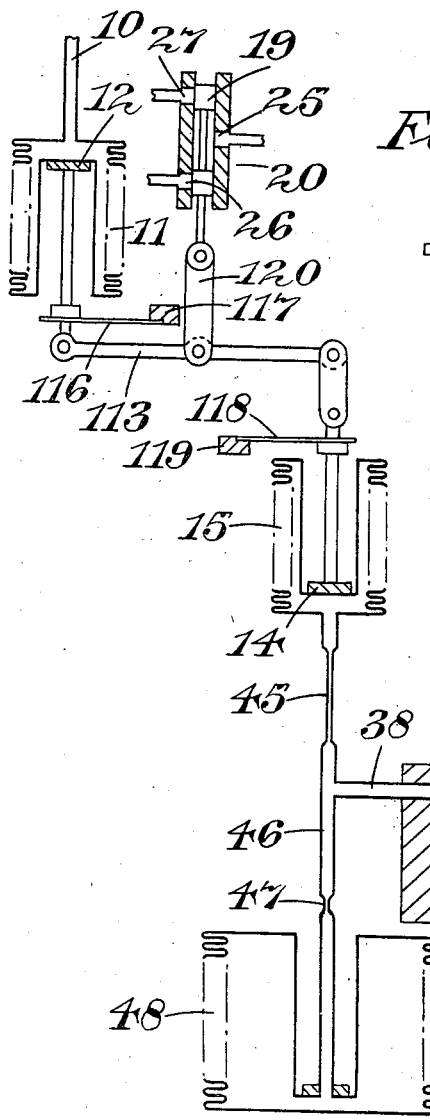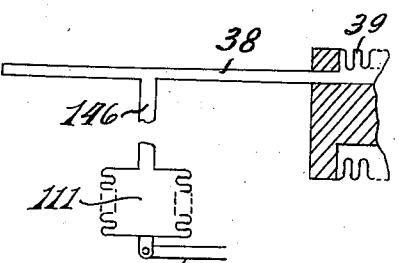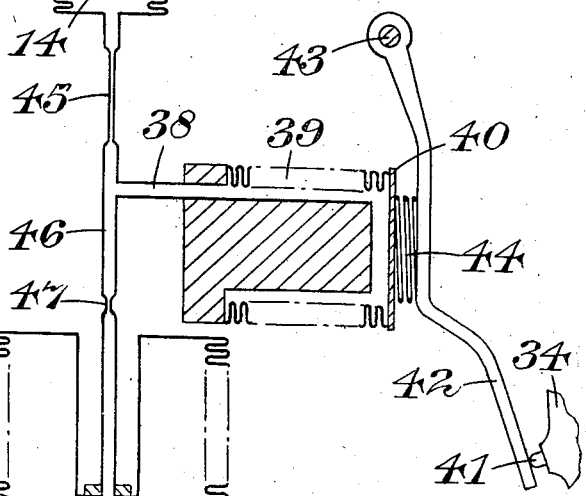
Fig. 3.
Fig. 4

Patented Dec. 1, 1942

2,303,752

UNITED STATES PATENT OFFICE 2,303,752

SERVO-CONTROL APPARATUS

Frederick William Meredith, London, England, assignor to S. Smith & Sons (Motor Accessories) Limited, London, England, a British company Application July 9, 1940, Serial No. 344,592
In Great Britain July 13, 1939

16 Claims. (Cl. 121—41)

This invention relates to servo-control apparatus for automatically regulating a quantity which is subject to variations. For example, such apparatus may be used for the automatic control of control-surfaces of an aircraft.

Servo-control apparatus comprises a servo-motor, a controller therefor, an instrument which detects variations in the quantity or condition to be controlled and is connected to the controller to adjust it accordingly, and means (termed the "follow-up") interconnecting the servo-motor and the controller whereby movements of the servo-motor are transmitted to the controller to restore it to its initial or a datum condition whereby the movement of the servo-motor is arrested or modified. Where the controller is a valve, one part of which (termed the "controlled part") is operated by the instrument, the follow-up may act either on a part of the valve other than the controlled part or the movement may be applied differentially to the controlled part. To whichever part the movement is applied, that part is herein termed the "follow-up element".

In order to ensure that the variation in the quantity to be controlled shall eventually be reduced to zero irrespective of, for example, the trim of the aircraft, it is known to apply an additional movement to the servo-motor in accordance with the time integral of the variation in the quantity to be controlled. This is ensured by providing means to allow the follow-up element to subside slowly to its datum position whatever the mean position of the servo-motor may be.

One object of the present invention is to provide an improved form of follow-up; another object is to enable the follow-up movements to be applied in a simpler manner to the follow-up element of the controller, another object is to simplify the means whereby the follow-up element is allowed to subside slowly to its datum position yet another object is the provision of a simple means for preventing what is known as "spontaneous servo-hunt," which can occur without variation in the quantity to be controlled.

According to one feature of the invention the follow-up comprises a fluid conduit, separate from the fluid circuit of the servomotor, for transmitting movements of the servomotor to the controller by the transfer of fluid through the conduit.

According to another feature of the invention, the follow-up element is constituted by the controlled part of the controller and is actuated according to the difference between a fluid pressure dependent on the quantity to be controlled and a fluid pressure produced by the flow of fluid in the follow-up conduit and dependent upon the displacement of the servomotor. In a convenient construction the controlled part of the controller is mechanically connected to a pressure-responsive control receiver operated by the fluid-pressure dependent upon the quantity or condition to be controlled and an independently movable pressure-responsive follow-up receiver operated by the fluid pressure dependent upon the displacements of the servomotor.

According to a further feature of the invention the follow-up fluid conduit comprises a resiliently loaded follow-up receiver operated by displacement of fluid in the conduit to effect displacement of the follow-up element according to the quantity of liquid displaced in the conduit.

Another feature of the invention consists in the provision of means for maintaining a substantially constant average pressure in the fluid conduit of the follow-up. For this purpose it is convenient to employ a leak passage for the follow-up fluid conduit providing a high resistance to the flow of fluid through the passage and a fluid reservoir to which the leak passage is connected and in which a substantially constant fluid pressure is maintained. Leakage of fluid through the leak passage has the effect of allowing the pressure in the follow-up receiver to return slowly to its datum value. Yet another feature of the invention consists in that the follow-up fluid conduit comprises a completely closed fluid system and consequently all possibility of leakage can be easily avoided.

Another feature of the invention consists in the provision of means to retard the flow of fluid in the follow-up fluid conduit for actuating the controller and a resilient loading member acting upon a fluid displacement device connected to the follow-up fluid conduit at that side of the retarding means remote from the controller. The retarding means, which may conveniently be in the form of a restricted passage leading to the follow-up receiver aforesaid, offers a high impedance to rapid variations and thereby prevent the spontaneous servo-hunt hereinbefore referred to. In the case in which the fluid conduit comprises a resiliently loaded follow-up receiver operated according to the quantity of fluid displaced in the conduit as aforesaid, the substantial quantity of fluid passing the retarding means provides a control not only according to variations of the quantity to be controlled but also according to the rate of change of that quantity. In one form this resilient loading member is interposed between the fluid displacement device and the servomotor so that the movements of the servomotor are transmitted to the fluid displacement device through the medium of the resilient loading member in order to produce a fluid flow actuating the controller. A further feature of the invention consists in the provision of means operated by the movement of the fluid displacement device aforesaid in excess of a predetermined amount to render the servomotor inoperative.

Specific embodiments of the invention are shown diagrammatically by way of examples in the accompanying drawings, in which—

Figure 3 is a diagram showing another modification of the apparatus shown in Figure 1.

Figure 4 is a diagram showing a still further modification of the invention.

Like references indicate like parts in the four figures of the drawings.

Figure 1:
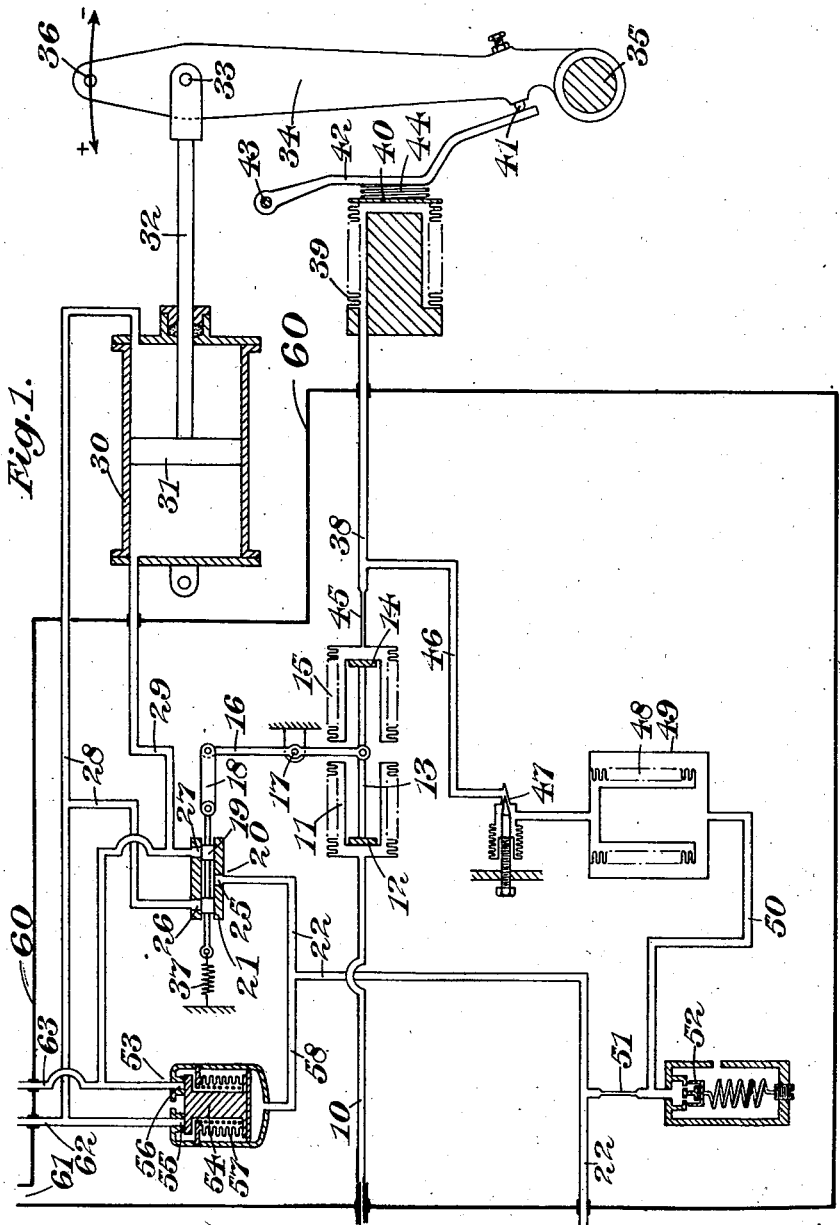
Figure 1 is a diagram of one form of the servo-control apparatus for use on aircraft for the control of the rudder, the elevators or the ailerons.
Figure 2:
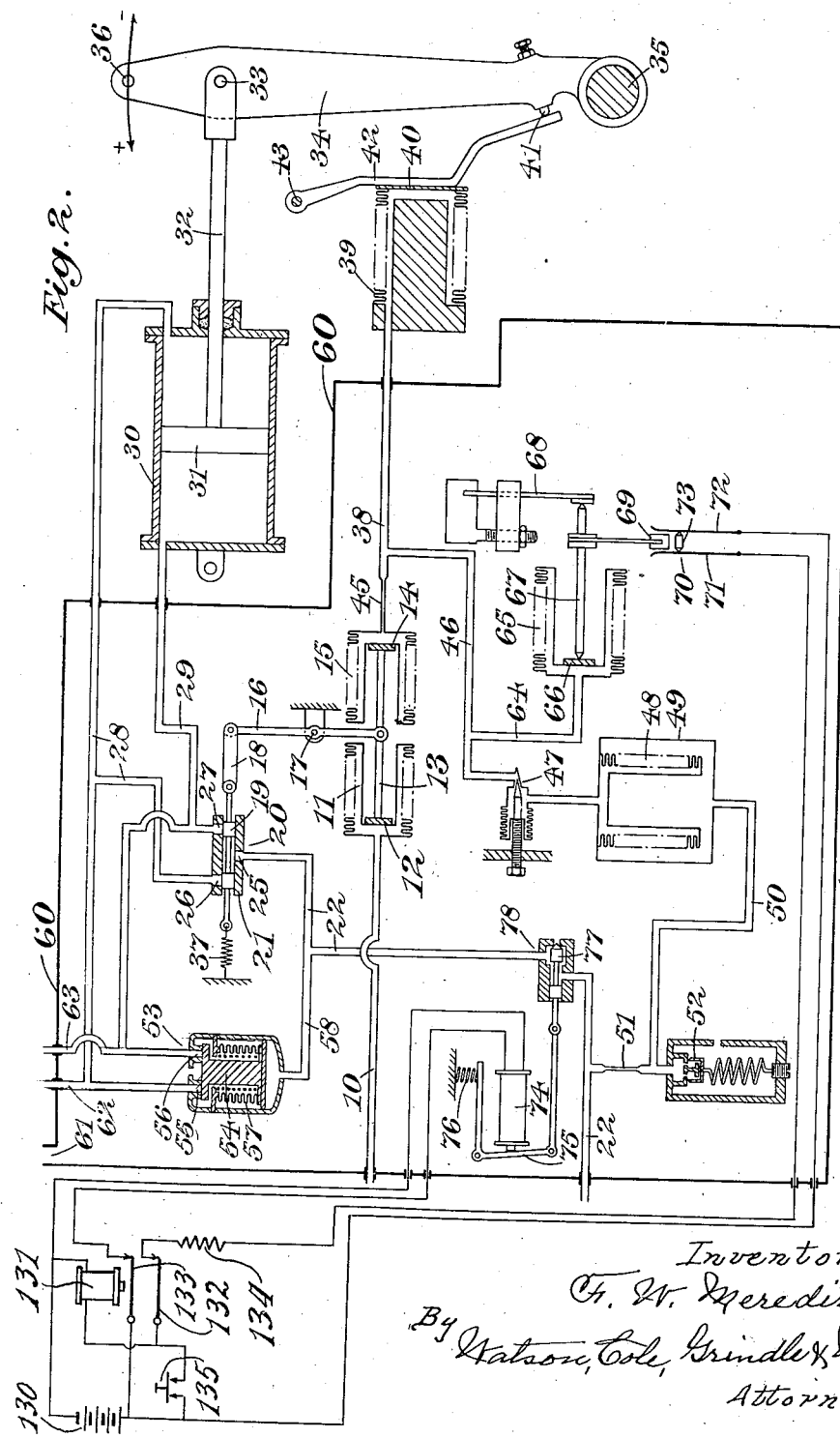
Figure 2 is a diagram showing a modified form of the apparatus for the control of the elevators of an aircraft.

For operation of the servo-control apparatus according to Figures 1 and 2 there is employed a fluid-pressure varying in accordance with detected deviations from a predetermined line of flight or other predetermined condition. Preferably, a gyroscope or other instrument detects the deviations and converts them into variations of air pressure in a pneumatic pipe line by the apparatus described in United States patent application No. 314,361. In Figure 1 of the accompanying drawings, this pipe line is indicated at 10 and terminates in a pressure-responsive control receiver 11 whereby a movable wall 12 thereof tends to move in accordance with the pressure in the pipe line 10. This movable wall 12 is connected by a rigid link 13 with the movable wall 14 of a pressure-responsive follow-up receiver 15 similar to the receiver 11.

The link 13 is connected to one arm of a lever 16 carried on a fixed pivot 17, the other arm of the lever being connected by a link 18 to the piston 19 of a control valve 20, this piston moving in a stationary cylindrical valve body 21. This valve 20 constitutes the controller of the servomotor and the piston 19 is the controlled part of this controller.

A pipe 22 connected to a supply of compressed air leads to a port 25 in the control valve body, this port communicating with a recess in the piston 19. The valve body 21 has two other ports 26 and 27 leading by pipes 28 and 29 respectively to opposite ends of the cylinder 30 of a servomotor. The servomotor has a piston 31 which is mounted on a piston rod 32, the outer end of which is pivotally connected at 33 to a lever 34 pivoted on a fixed member 35. This lever 34 is connected at a point 36 to the control surface to be operated. Thus, when the piston 19 is displaced from its central position, air under pressure is supplied by the valve to one end or the other of the servomotor cylinder 30 according to the direction of displacement of the valve piston and the other end of the servomotor cylinder is exhausted by the valve 20. The servomotor piston 31 and the lever 34 are thus moved in one direction or the other according to the direction of movement of the valve piston 19. A spring 37 serves to take up lost motion in the linkage 16, 18.

The follow-up fluid circuit comprises a pipe 38 leading from the pressure-responsive follow-up receiver 15 to a fluid displacement device in the form of a collapsible receptacle 39 having a movable end wall 40. The lever 34 carries an abutment 41 bearing on an arm 42 movable about a fixed pivot 43 and a spring 44 is interposed between this arm and the movable wall 40 of the collapsible receptacle 39.

The pipe 38 has at its entry to the follow-up receiver 15 a choke 45 formed for example by a reduction in diameter of the pipe. This choke, which may be adjustable, is intended to offer negligible resistance to the flow of fluid slowly through it, but a substantial resistance to surges of fluid at a high velocity.

The pipe 38 has a branch 46 leading past an adjustable choke 47 of high resistance to the interior of a collapsible reservoir 48. This collapsible reservoir is enclosed in an outer casing 49 which is connected by a pipe 50 to the pipe 22 supplying air under pressure for operating the servomotor. This pipe 50 includes a high resistance choke 51 and the pipe is furthermore connected to a pressure-relief valve 52 which automatically maintains the air-pressure constant in the casing 49. The follow-up fluid circuit is charged with a liquid and is completely closed.

In the equilibrium condition the datum pressure in the control receiver 11 balances the datum pressure in the follow-up receiver 15 and the valve piston 19 is central so that the servomotor is at rest. When a deviation of the craft occurs, the pressure in the control receiver 11 is varied, for instance it rises, so that the valve moves and causes the servomotor to move in the appropriate direction to correct the deviation. The consequential movement of the lever 34 by the servomotor operates through the arm 42 to load the spring 44 and thereby compress the collapsible receptacle 39 and displace liquid through the pipe 38 and the choke 45 to produce a rise of pressure in the follow-up receiver 15. After an appropriate movement of the servomotor the pressures in the receivers 11 and 15 are again balanced so that the valve piston 19 is returned to its central position and further movement of the servomotor is prevented. Should the deviation be in the reverse direction causing a reduced pressure in the receiver 11 the consequential movement of the lever 34 by the servomotor will produce a reduction of pressure in the collapsible receptacle 39 and a reduction in pressure in the follow-up receiver 15 to provide a balance of pressures in the receivers 11 and 15.

If steady conditions are attained with a pressure in the receiver 11 differing from its datum value, i. e., with a steady deviation of the craft the pressure in the follow-up fluid conduit due to loading of the spring 44 will differ from the pressure in the reservoir 48 and the slow transfer of liquid across the high resistance choke 47 will take place which will gradually operate the control valve 20 of the servomotor to turn the craft until the pressure in the control receiver 11 is restored to its datum value. Thus, an additional movement of the servomotor depending upon the time integral of the variation of the control quantity is produced by the gradual transfer of liquid to or from the reservoir 48 in which constant pressure is maintained.

The tendency for rapid spontaneous servomotor hunting which is due to the elasticity of the air in the servomotor and the inertia of the parts moved by the servomotor is overcome by the choke 45. This choke heavily damps rapid changes of pressure in the follow-up receiver 15 in order to prevent this hunting, but offers inappreciable resistance to the flow of fluid resulting from the comparatively slow normal movements of the follow-up system.

A pneumatic cut-out 53 has a valve member 54 normally closing ports 55 and 56 connected respectively to the pipes 28 and 29. The valve member is normally maintained in its closed position against the action of a spring 57 by means of the air pressure applied thereto through a pipe 58. Should the air pressure fail, the valve member 54 is moved by the spring 57 to open the ports 55 and 56 and so vent both sides of the servomotor cylinder.

The control valve 20, the receivers 11 and 15, the adjustable choke 47 and reservoir 48, the relief valve 52 and the pneumatic cut-out 53 are all contained in an air-tight casing 60 into which casing air is exhausted in the various circumstances hereinbefore described. The air is withdrawn from the casing through a return pipe 61 and may be used over and over again, whereby the problem of cleaning and drying the air is simplified.

Pipes 62 and 63 may be provided for connection to a differential pressure gauge to indicate the load on the servomotor. The air-tight casing 60 may be arranged in close proximity to the servomotor and at a considerable distance from the controlling instrument which has only to be connected by the single pipe-line 10. The follow-up circuit hereinbefore described also has the advantage that the reservoir 48 compensates for differential thermal expansion.

In the modification shown in Figure 2 the movable wall 40 of the collapsible receptacle 39 is directly actuated by the arm 42 instead of through a spring. In place of the spring the pipe 46 has a branch 64 connected to the interior of a collapsible control receptacle or fluid displacement device 65. This control receptacle has a movable part 66 which is engaged by a rod 67 to which force is applied by an adjustable spring 68. The adjustment of this spring is effected by means of movement of the member 68a by the rotation of the nut 68b. The rod 67 carries an operating member 69 for a double-acting circuit-breaker 70 whereby excessive movements in either direction of the movable part 66 of the control receptacle breaks an electric circuit between one or other of two flexible conductors 71 and 72 and a rigid connecting member 73. The circuit includes a battery 130, the coil 131 of a hold-on relay, holding contacts 132 of the relay, and a retaining resistance 134. A circuit is completed from the battery through the hold-on relay contacts 133 to an electromagnet 74 having a movable armature 75 normally held in the retracted position against the action of a spring 76. The armature 75 is connected to the movable valve member 77 of a cut-off valve 78 connected in the air supply pipe 22. Thus, should excessive movements of the movable part 66 of the control receptacle 65 occur, the hold-on relay and the electromagnet 74 are de-energised and the valve member 77 is retracted by the spring 76 to open the air supply pipe 22 to the casing 60. Such a relief of pressure in the pipe 22 causes the cut-out 53 to operate and vent both ends of the servomotor cylinder until such time as the hold-on relay may be again closed by operating push button 135 while the double-acting circuit-breaker 70 is again central.

In the apparatus shown in Figures 1 and 2, the receivers 11 and 15 are pressure operated and actuate the control valve 20 according to the difference of pressure in the receivers. In the modification shown in Figure 3, the motions of the fluid-operated receivers are substantially independent and the controller is operated by the difference of their movements.

Referring to Figure 3, the movable end walls 12 and 14 of the receivers are connected respectively to opposite ends of a differential beam 113 connected at its centre by a link 120 to the piston 19 of the valve 20. The fluid pressure in the receiver 11 is opposed by a leaf-spring 116 carried by a fixed part 117. The pressure in the receiver 15 is, as will appear hereinafter, normally atmospheric pressure and any changes of the pressure in this receiver are opposed by a leaf-spring 118 carried by another fixed part 119. The follow-up receiver 15 is connected through the choke 45 to the collapsible receptacle 39, the movable end wall 40 of which is actuated through the spring 44 by the arm 42, as in the arrangement shown in Figure 1. Also, as in Figure 1, a branch pipe 46 leads past the choke 47 to the collapsible reservoir 48 which in this case has a datum pressure constituted by atmospheric pressure on the exterior of the reservoir.

In the equilibrium condition the valve piston 19 is held in the central position by means of the leaf-springs so that the servomotor is at rest. When a deviation of the craft occurs, the pressure in the line 10 is changed and causes that end of the beam 113 conected to the receiver 11 to be deflected. The beam 113 which is thus rocked, opens the valve 20 and causes the servomotor to move in the appropriate direction to correct the deviation. Consequential movement of the arm 42 produces a flow of fluid into the follow-up receiver 15 displacing the movable wall 14 of this receiver against the action of the leaf-spring 118 to rock the beam 113 back towards the position in which the valve 20 is closed. After an appropriate movement of the servomotor, the follow-up receiver 15 re-centres the valve piston 19 and further movement of the servomotor is prevented. If static conditions are obtained with a displacement of the receiver 11 differing from its datum position, i. e., with a steady deviation of the craft, there will be a corresponding displacement of the follow-up receiver 15. The fluid in the receiver 15 will, owing to the deflection of the spring 118, be of higher or lower pressure than the datum pressure of the reservoir 48 and a slow transfer of liquid will take place across the choke 47 which will gradually operate the control valve 20 to turn the craft until the follow-up receiver 15 is returned to its normal condition with the pressure in the line 10 at its normal datum value.

The tendency for rapid spontaneous servomotor hunting is overcome by the choke 45, as in the construction shown in Figures 1 and 2. Furthermore, in this apparatus in which the follow-up operates by substantial flow of fluid into and out of the receiver 15 the retarding effect produced by the choke 45 and the spring 44 renders the movement of the valve 20 dependent both on the deviation of the craft and the velocity of the deviation, as the retarding effect is proportional to the rate of flow.

In the arrangement shown in Figure 3, the spring 44 may be substituted by the spring-controlled collapsible receptacle 65, as shown in Figure 2, with or without the circuit breaker 70.

The follow-up through a fluid circuit has the further advantage that a plurality of variables, including that provided by the servomotor can be introduced into the motion of the controller through the fluid circuit by means of a plurality of fluid displacement devices, thereby avoiding the need for differential mechanism; for example, when it is desired to incorporate the known feature of superimposing an altitude control on an attitude control.

Thus, if the arrangement shown in Figure 2 controls the elevators of an aircraft, an altitude control may be superimposed by means of the circuit shown in Figure 4 wherein the displacement device 111, which is in communication with the conduit 38 by means of the branch conduit 146, is operatively connected to the aneroid bellows 110, so that the displacement of the device is dependent on the atmospheric pressure. The elements 38 and 39 shown in Figure 4 are the equivalents of the similarly numbered members shown in the other figures of the drawings.

I claim:

1. A servo-control apparatus comprising a fluid-operated servomotor, a fluid system for said servomotor, a controller for said servomotor in said fluid system, means adjusting said controller according to variations of a condition to be controlled and a follow-up connection between said servomotor and said controller, said follow-up connection comprising a fluid conduit separate from the fluid system of the servomotor for transmitting movements of the servomotor to the controller by the transfer of fluid through the conduit, means for retarding the flow of fluid in said fluid conduit, a fluid displacement device connected to said conduit at that side of the retarding means remote from said controller and a resilient loading member acting upon said fluid displacement device.

2. A servo-control apparatus comprising a fluid-operated servomotor, a fluid system for said servomotor, a controller for said servomotor in said fluid system, means adjusting said controller according to variations of a condition to be controlled and a follow-up connection between said servomotor and said controller, said follow-up connection comprising a fluid conduit separate from the fluid system of the servomotor, a fluid displacement device connected to said conduit and actuated by the servomotor, resilient means interposed between said fluid displacement device and the servomotor, controller actuating means operated according to the transfer of fluid in said conduit and means in said conduit to retard the flow of fluid therein.

3. A servo-control apparatus comprising a fluid-operated servomotor, a fluid system for said servomotor, a controller for said servomotor in said fluid system, means adjusting said controller according to variations of a condition to be controlled, a follow-up connection between said servomotor and said controller, said follow-up connection comprising a fluid conduit separate from the fluid system of the servomotor for transmitting movements of the servomotor to the controller by the transfer of fluid through the conduit, means for retarding the flow of fluid in said conduit, a fluid displacement device connected to said fluid conduit at that side of the retarding means remote from said controller, a resilient loading member acting upon said fluid displacement device and means operated by a movement of said fluid displacement device in excess of a predetermined amount to render the servomotor inoperative.

4. A servo-control apparatus comprising a fluid-operated servomotor, a fluid system for said servomotor, a controller for said servomotor in said fluid system, means adjusting said controller according to variations of a condition to be controlled and a follow-up connection between said servomotor and said controller and comprising a completely closed fluid system separate from the fluid system of the servomotor, said closed fluid system comprising a fluid displacement device actuated by the servomotor, a fluid pressure operated device actuating said controller, a restricted passage connecting said devices, a constant pressure fluid reservoir and a restricted passage connecting said reservoir to said fluid displacement device, and resilient means interposed between said servomotor and said fluid displacement device.

5. A servo-control apparatus comprising a fluid-operated servomotor, a fluid system for said servomotor, a controller for said servomotor in said fluid system, means adjusting said controller according to variations of a condition to be controlled and a follow-up connection between said servomotor and said controller and comprising a completely closed fluid system separate from the fluid system of the servomotor, said closed fluid system comprising a fluid displacement device actuated by the servomotor, a fluid pressure operated device actuating said controller, a restricted passage connecting said devices, a constant pressure fluid reservoir and a restricted passage connecting said reservoir to said fluid displacement device, a second fluid operated device connected to the fluid displacement device and resilient means loading said second fluid operated device.

6. A servo-control apparatus comprising a fluid-operated servomotor, a fluid system for said servomotor, a controller for said servomotor in said fluid system, means adjusting said controller according to variations of a condition to be controlled and a follow-up connection between said servomotor and said controller and comprising a completely closed fluid system separate from the fluid system of the servomotor, said closed fluid system comprising a fluid displacement device actuated by the servomotor, a fluid pressure operated device actuating the controller, a restricted passage connecting said devices, a constant pressure fluid reservoir and a restricted passage connecting said reservoir to the said fluid displacement device, resilient means opposing movement of said fluid pressure operated device from a datum position and resilient means interposed between said servomotor and the fluid displacement device.

7. A servo-control apparatus comprising a fluid-operated servomotor, a fluid system for said servomotor, a controller for said servomotor in said fluid system, means adjusting said controller according to variations of a condition to be controlled and a follow-up connection between said servomotor and said controller and comprising a completely closed fluid system separate from the fluid system of the servomotor, said closed fluid system comprising a fluid displacement device actuated by the servomotor, a fluid pressure operated device actuating the controller, a restricted passage connecting said devices, a constant pressure fluid reservoir, a restricted passage connecting said reservoir to the first said fluid displacement device, resilient means opposing movement of said fluid pressure operated device from a datum position, a second fluid operated device connected to the fluid displacement device, and resilient means loading said second fluid operated device.

8. A servo-control apparatus comprising a fluid-operated servomotor, a fluid system for said servomotor, a controller for said servomotor in said fluid system, means adjusting said controller according to variations of a condition to be controlled, a follow-up connection between said servomotor and said controller comprising a fluid conduit separate from the fluid system of the servomotor for transmitting movements of the servomotor to the controller by the transfer of fluid through the conduit and at least one additional fluid displacement device communicating with said fluid conduit for transmitting movement to the controller depending upon a variation of another variable condition.

9. A servo-control apparatus comprising a fluid operated servomotor, a controlling fluid system for actuating said servomotor, a controller for said servomotor operatively connected with said fluid system, means adjusting said controller according to variations of a condition to be controlled, a follow-up system between said servomotor and said controller comprising a fluid system completely closed and separate from said first-named fluid system, said second-named or follow-up fluid system including a fluid displacement device actuated in response to controlled movements of the servomotor, a fluid pressure operated device operatively connected to said controller, and an elongated conduit providing closed communication therebetween, a leak passage from said conduit and a collapsible fluid reservoir to which said leak passage is connected, said leak passage being the sole means of connection either fluid or mechanical, between said reservoir and said follow-up system, and means for maintaining a substantially constant fluid pressure in said fluid reservoir, whereby a substantially constant average pressure is maintained in said follow-up fluid system regardless of any effective change in length of follow-up.

10. A servo-control apparatus for controlling a measurable condition comprising a servomotor for regulating the measurable condition, a two part controller controlling the supply of power thereto, said servomotor being of the type which continues to move so long as the two parts of the controller are relatively displaced, means for effecting relative displacement in response to variation of the condition to be controlled, a fluid displacement device connected to one part of the controller, a second fluid displacement device connected to the servomotor, a fluid conduit extending between the two devices, movements of the servomotor being transmitted to said one part of the controller to restore the relative displacement of the two parts by the transfer of fluid through the conduit, a reservoir for supplying fluid to the conduit, means for subjecting the fluid in the reservoir to a constant datum pressure, means for subjecting the first fluid displacement device to an external pressure which is a function of the condition to be regulated and a high resistance leak passage connecting the reservoir to the conduit, said conduit displacement devices, reservoir and passage forming a completely closed fluid system.

11. A servo-control apparatus as claimed in claim 10, wherein the means for subjecting the first fluid displacement device to an external pressure which is a function of the condition to be regulated comprises a third fluid displacement device.

12. A servo-control apparatus as claimed in claim 10, wherein the means for subjecting the first fluid displacement device to an external pressure which is a function of the condition to be regulated comprises a spring interposed between the first fluid displacement device and a fixed part of the apparatus and stressed to an extent determined by the variation of said condition from a datum value.

13. A servo-control apparatus for controlling a measurable condition comprising a servomotor for regulating the measurable condition, a two part controller controlling the supply of power thereto, said servomotor being of the type which continues to move so long as the two parts of the controller are relatively displaced, means for effecting relative displacement in response to variation of the condition to be controlled, a fluid displacement device connected to one part of the controller, a second fluid displacement device connected to the servomotor, a fluid conduit extending between the two devices, movements of the servomotor being transmitted to said one part of the controller to restore the relative displacement of the two parts by the transfer of fluid through the conduit, a reservoir for supplying fluid to the conduit, means for subjecting fluid in the reservoir to a constant datum pressure, means for controlling the pressure of the fluid in the conduit as a function of the condition to be regulated and a high resistance leak passage connecting the reservoir to the conduit, said conduit, displacement devices, reservoir and passage forming a completely closed fluid system.

14. A servo-control apparatus as claimed in claim 13, wherein the means for regulating the pressure in the conduit comprises a third fluid displacement device subject to a pressure determined by the value of the condition to be regulated reacting on the first fluid displacement device.

15. A servo-control apparatus as claimed in claim 13, wherein the means for regulating the pressure in the conduit comprises a spring reacting on the first fluid displacement device strained by an amount mainly determined by the value of the condition to be regulated.

16. A servo-control apparatus for controlling a measurable condition comprising a servomotor adapted for regulating the measurable condition, a two part controller controlling the supply of power thereto and responsive to variation of the condition to be controlled, and a fluid follow-up system comprising a pressure operated device also controlling the two part controller, a fluid conduit communicating with said pressure operated device, a resilient fluid loading device also in communication with said conduit, means for changing the load on said resilient fluid loading device operated by the movement of the servomotor, a reservoir maintained at substantially constant gauge pressure for supplying fluid to the conduit, a high resistance leak passage connecting the reservoir to the conduit, said fluid follow-up system forming a completely closed fluid system to prevent loss of fluid.

FREDERICK WILLIAM MEREDITH.